United States Patent
Lian et al.

(10) Patent No.: US 11,044,251 B2
(45) Date of Patent: Jun. 22, 2021

(54) METHOD AND SYSTEM FOR AUTHENTICATION VIA AUDIO TRANSMISSION

(71) Applicant: Mastercard Asia/Pacific Pte. Ltd., Singapore (SG)

(72) Inventors: Shiying Lian, Singapore (SG); Donghao Huang, Singapore (SG); Naman Aggarwal, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 328 days.

(21) Appl. No.: 16/000,440

(22) Filed: Jun. 5, 2018

(65) Prior Publication Data
US 2018/0359249 A1    Dec. 13, 2018

(30) Foreign Application Priority Data
Jun. 9, 2017 (SG) .............................. 10201704772S (51) Int. Cl.
*H04L 29/06* (2006.01)
*G10L 25/51* (2013.01)

(52) U.S. Cl.
CPC .......... *H04L 63/0876* (2013.01); *G10L 25/51* (2013.01); *H04L 63/0492* (2013.01); *H04L 63/08* (2013.01); *H04L 63/0853* (2013.01)

(58) Field of Classification Search
CPC ............. H04L 63/0853; H04L 63/0876; H04L 63/0492; H04L 63/08; G10L 25/51
See application file for complete search history.

(56) References Cited

U.S. PATENT DOCUMENTS

| 9,471,698 | B1* | 10/2016 | Liu | ..................... G06F 16/9554 |
| 2009/0287921 | A1* | 11/2009 | Zhu | ..................... H04L 63/0869 713/155 |
| 2011/0219427 | A1* | 9/2011 | Hito | ........................ G06F 21/00 726/3 |
| 2011/0270751 | A1* | 11/2011 | Csinger | ................... H04L 63/18 705/42 |
| 2012/0131653 | A1* | 5/2012 | Pasquero | ................ G06F 21/42 726/6 |
| 2012/0330769 | A1* | 12/2012 | Arceo | ................ G06Q 20/4014 705/21 |
| 2014/0168344 | A1* | 6/2014 | Shoemake | .......... H04M 3/5315 348/14.01 |

(Continued)

*Primary Examiner* — Matthew T Henning (57) ABSTRACT

A method for remote authentication aided by an audio signal includes: storing, in a memory of a computing device, at least first authentication data; receiving, by a first input device of the computing device, an audio signal electronically transmitted by a separate computing system; decoding, by a decoding module of the computing device, the received audio signal to identify a server identification value; receiving, by a second input device of the computing device, second authentication data submitted by a user of the computing device; authenticating, by an authentication module of the computing device, the received second authentication data based on the stored first authentication data; and electronically transmitting, by a transmitting device of the computing device, a result of the authentication and a profile identifier to an external processing server based on the server identification value.

20 Claims, 5 Drawing Sheets

(56) References Cited

U.S. PATENT DOCUMENTS

| | | | | |
|---|---|---|---|---|
| 2014/0330894 A1* | 11/2014 | Zhao | ............... | H04L 67/142 |
| | | | | 709/203 |
| 2015/0215299 A1* | 7/2015 | Burch | ............... | H04W 12/0609 |
| | | | | 726/5 |
| 2015/0295962 A1* | 10/2015 | Zheng | ............... | H04L 67/10 |
| | | | | 709/204 |
| 2016/0048669 A1* | 2/2016 | Kim | ............... | G06K 9/0061 |
| | | | | 726/19 |
| 2017/0244676 A1* | 8/2017 | Edwards | ............... | G06F 21/35 |

* cited by examiner

METHOD AND SYSTEM FOR AUTHENTICATION VIA AUDIO TRANSMISSION

CROSS REFERENCE TO RELATED APPLICATIONS

This application claims priority to Singapore Application Serial No. 10201704772S, filed Jun. 9, 2017, which is incorporated herein by reference in its entirety.

FIELD

The present disclosure relates to authenticating via audio transmission, specifically the performing of remote authentication using a third party device that is accomplished via the use of an audio transmission received at the third party device and encoded with data used thereby.

BACKGROUND

Users of computing devices often have to authenticate themselves several times each and every day. Traditionally, authentication occurs directly on the computing device they are using, and is performed in conjunction with an application program, web site, or service that the user is trying to access. For example, the user may provide a username and password combination to log in to a website, or may provide their fingerprint or other biometric to access data stored in a mobile computing device. In an effort to increase security, some systems have begun to use more sophisticated methods of authentication, such as more complicated biometrics, the use of multiple types of authentication (e.g., password and fingerprint combination), or two-factor authentication.

However, the implementation of such authentication schemes can often be difficult, time-consuming, and require extensive resources to accomplish, which may be difficult for many entities to develop and utilize. In addition, there may be instances where the user may be uncomfortable with providing their sensitive authentication information. For example, a user may access a public terminal, such as at a net café, and may be wary of typing in their password or providing biometrics to the terminal, for fear of the data being compromised, seen by another person, etc.

Thus, there is a need for a technical solution to enable a user to be authenticated on an external computing system via the use of a separate computing device. Such a technological improvement may enable a user to be authenticated to the satisfaction of a website, application program, or other tool, without the user having to provide authentication data directly to the tool, and without requiring the tool to develop sophisticated authentication methods.

SUMMARY

The present disclosure provides a description of systems and methods for remote authentication aided by an audio signal. An external computing system that wants to authenticate a user emits an audio signal that is encoded with data identifying that computing system or a service associated therewith that wants to authenticate the user. The user performs authentication on a separate computing device that receives the audio signal, and then transmits identifying information, or at least a result of the authentication, to the external computing system, as identified based on the data encoded in the audio signal. As a result, the user can be authenticated at the external computing system without requiring the external computing system to spend significant time and resources developing an authentication system, and enabling the user to authenticate themselves with a tool on an external computing system that may be publicly accessible to prevent the compromise of their authentication data.

A method for remote authentication aided by an audio signal includes: storing, in a memory of a computing device, at least first authentication data; receiving, by a first input device of the computing device, an audio signal electronically transmitted by a separate computing system; decoding, by a decoding module of the computing device, the received audio signal to identify a server identification value; receiving, by a second input device of the computing device, second authentication data submitted by a user of the computing device; authenticating, by an authentication module of the computing device, the received second authentication data based on the stored first authentication data; and electronically transmitting, by a transmitting device of the computing device, a result of the authentication and a profile identifier to an external processing server based on the server identification value.

A system for remote authentication aided by an audio signal includes: a memory of a computing device configured to store at least first authentication data; a first input device of the computing device configured to receive an audio signal electronically transmitted by a separate computing system; a decoding module of the computing device configured to decode the received audio signal to identify a server identification value; a second input device of the computing device configured to receive second authentication data submitted by a user of the computing device; an authentication module of the computing device configured to authenticate the received second authentication data based on the stored first authentication data; and a transmitting device of the computing device configured to electronically transmit a result of the authentication and a profile identifier to an external processing server based on the server identification value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

There is provided a system and method for performing remote authentication of a user using an audio signal emitted from an external computing system. The user is authenticated when a user device in close proximity to the user is able to detect the transmitted audio signal, and correspondingly can interface with a web server to authenticate the user. The system and method can aid in enabling user authentication without a need for modification to existing infrastructure, and instances where the user's authentication data is compromised can be minimized.

System for Remote Authentication Via Audio Signal Transmission

Figure 1:
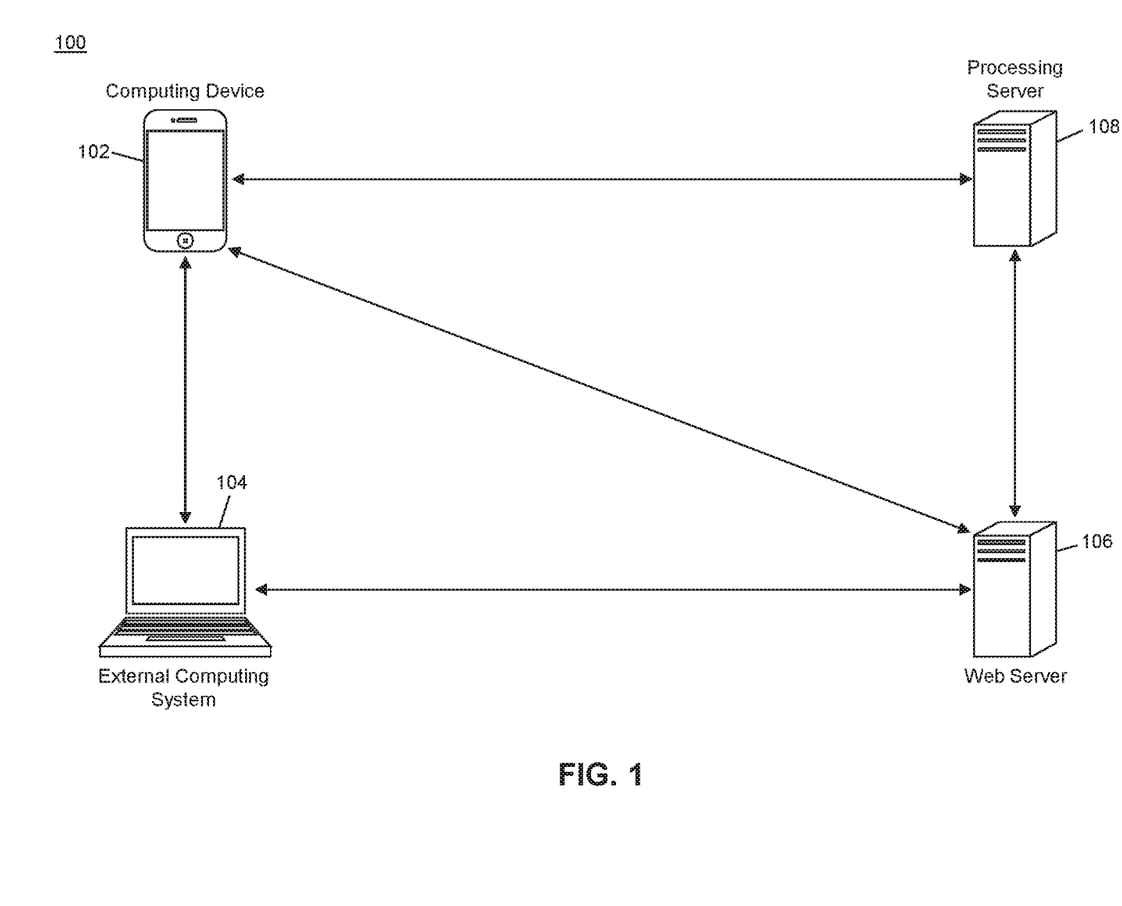
FIG. 1 is a block diagram illustrating a high level system architecture for remote authentication via audio signals in accordance with exemplary embodiments.

FIG. 1 illustrates a system 100 for the performing of remote authentication at a user device via the use of a transmitted audio signal encoded with data.

The system 100 may include a computing device 102. The computing device 102, discussed in more detail below, may be configured to perform remote authentication of a user thereof, on behalf of an external computing system 104, aided by the use of an audio signal emitted by the external computing system 104. As discussed below, the computing device 102 may be any type of computing device that may be specifically configured to perform the functions discussed herein. For instance, the computing device 102 may be a specifically configured desktop computer, laptop computer, notebook computer, tablet computer, cellular phone, smart phone, smart watch, smart television, wearable computing device, implantable computing device, etc. The external computing system 104 may, similarly, be any type of computing system that is specifically configured to perform the functions discussed herein. In an example, the external computing system 104 may be a desktop computer in a public place (e.g., a coffee shop, Internet café, etc.), while the computing device 102 may be a smart phone possessed by the user being authenticated.

The user may use the external computing system 104 to access an application program or other tool for which the user may be authenticated. For instance, the user may use a web browsing application program to access a web site hosted by a web server 106. As part of the access to the web site, the user may initiate a login process to the web site, where the web site may seek to identify the user to provide specific content thereto. Traditionally, the user would use the external computing system 104 to directly provide authentication data to the web server 106, which would then perform the authentication and identify the user based thereon. In the system 100, the user may initiate authentication with the web site via the external computing system 104. The web server 106 may then instruct the external computing system 104 to emit an audio signal to be received by the computing device 102. The audio signal may be emitted using a suitable audio emitting device of the external computing system 104, such as a speaker.

The audio signal may be encoded with at least a server identification value. In some embodiments, the server identification value may be encoded within the audio signal itself using suitable methods of encoding that will be apparent to persons having skill in the relevant art. In other embodiments, the server identification value may be encoded via the audio signal being a predetermined audio signal that is associated with that server identification value. In some cases, the audio signal may be ultrasonic and beyond the natural hearing range for the user of the computing device 102. In other cases, the audio signal may be within the hearing range of the user, but where the encoding may be such that the user cannot discern the server identification value by hearing the audio signal. The computing device 102 may have an input device configured to receive the emitted audio signal, such as a microphone configured to receive and record such a signal. The computing device 102 may then decode the signal to identify the server identification value. The server identification value may be a unique value associated with the web server 106 or other system that is seeking to authenticate the user.

In some embodiments, the external computing device 104 may be configured to emit an audio signal at pre-determined intervals, whereby during instances when the computing device 102 fails to receive the emitted audio signal (for example, when the computing device 102 is out of range when the user has moved from a desired position), the computing device 102 is subsequently unable to authenticate the user and the remote authentication process consequently ceases as the computing device 102 ceases communications with the web server 106. Once the remote authentication process ceases, the user is consequently logged out from the application program which requires authentication of the user.

In some embodiments, the server identification value may be an Internet Protocol address or other value that may be used by the computing device 102 to contact or otherwise provide data to the web server 106. In other embodiments, the server identification value may be a unique value used for identification, such as an identification number, which may be used by the computing device 102 to identify communication data for use in contacting the web server 106. For example, the computing device 102 may store a lookup table of communication data and identification value pairs associated with each web server 106 (e.g., and other entity that may seek to authenticate the user), and may identify communication data for the web server 106 when a server identification value is decoded from a received audio signal.

Once the audio signal has been received and decoded, the computing device 102 may authenticate the user. User authentication may be performed using any suitable method, such as the entry of authentication information (e.g., username, password, personal identification number, etc.), biometric data (e.g., fingerprint, retinal scan, vocal emission, facial scan, palm scan, etc.), etc. The computing device 102 may authenticate the user directly on the device, or may utilize one or more third party systems for performing authentication. For example, the user may provide biometric data to the computing device 102, which may supply (e.g., encrypted) the biometric data to a third party for authentication thereof, where the third party may supply the computing device 102 with a result (e.g., success or failure) of the authentication.

Once the user has been successfully authenticated, the computing device 102 may electronically transmit an indication thereof to the web server 106. The electronic transmission may utilize any suitable communication method, where the web server 106 may be contacted via the server identification value decoded from the audio signal. In some cases, the indication to the web server 106 may indicate only that the authentication was successful. In other cases, the transmission to the web server 106 may also include information identifying the user. For instance, the user may have a profile identifier stored in the computing device 102 that may be provided to the web server 106 for identification of the authenticated user. In another example, the computing device 102 may have a unique device identifier associated therewith (e.g., a media access control address, registration number, serial number, phone number, etc.), which may be provided to the web server 106 for identification of the user.

The web server 106 may receive the electronic transmission from the computing device 102 and may then provide the user (e.g., via the external computing system 104) with customized content following their identification. In some embodiments, the transmission may include additional data used to identify the external computing system 104 and/or the session in which the user is requesting authentication. For example, for a busy web site, there may be hundreds or thousands of users trying to authenticate at the same time. In such instances, the audio signal may be further encoded with a session identifier or other unique value that can be used by the web server 106 to differentiate such instances. The unique value may be, for example, a digital token, random or pseudo-random number, or other suitable value. In one example, the session identifier may be a unique value associated with the web browsing application program executed by the external computing system 104. In some cases, multiple values may be used, such as a session identifier associated with the authentication session and a browser identification value. In such cases, multiple values may be used depending on the circumstances of the authentication, such as when the user is in an area featuring a number of external computing systems 104 that may each be emitting audio signals for authentication.

In some embodiments, the system 100 may also include a processing server 108. The processing server 108 may be a third party computing system that may be used to perform additional functions of the system 100. For instance, the processing server 108 may provide a platform where entities, such as the web server 106, may register for use of the authentication method discussed herein. As part of the registration, the web server 106 may provide their contact information to the processing server 108, which may furnish the web server 106 with a server identification value. In such embodiments, the processing server 108 may provide the communication data for web servers 106 and other entities to the computing device 102 along with the corresponding server identification value, such as for storage as the communication data and identification value pairs stored therein. In some cases, the computing device 102 may contact the processing server 108 when an audio signal is received and decoded, for identification of the communication data associated with a decoded server identification value. In such cases, the computing device 102 may not store communication data directly, and may instead request the communication data from the processing server 108 when a new server identification value is decoded. In other cases, the computing device 102 may provide the server identification value (e.g., and any other data decoded from the audio signal) as well as the authentication result (e.g., and any additional data, such as the profile identifier) to the processing server 108 following authentication on the computing device 102. In such cases, the processing server 108 may forward the authentication result to the web server 106 as identified using the server identification value, where the web server 106 may be contacted using the registered communication method.

The methods and systems discussed herein enable authentication to be performed remotely on a computing device 102 for a web server 106 or other entity. As a result, the web server 106 or other entity does not need to develop their own authentication methods, and may instead rely on the computing device 102 to perform any authentications as needed. This may, therefore, result in authentication being performed for web servers 106 and other entities more efficiently and with fewer expenses. In addition, the use of the computing device 102 to perform the authentication for the web server 106 remotely may increase the security provided to the user, particularly in instances where the external computing system 104 may be a publicly accessible device. Furthermore, movement of the user away from the external computing system 104 can also be detected, and instances of forgetting to log out from an application program at the external computing system 104 when the user leaves the external computing system 104 can also be avoided. The use of the computing device 102 for remote authentication may significantly decrease the risk that the user's authentication data will be compromised as it may never come into contact with the external computing system 104.

Computing Device

Figure 2:
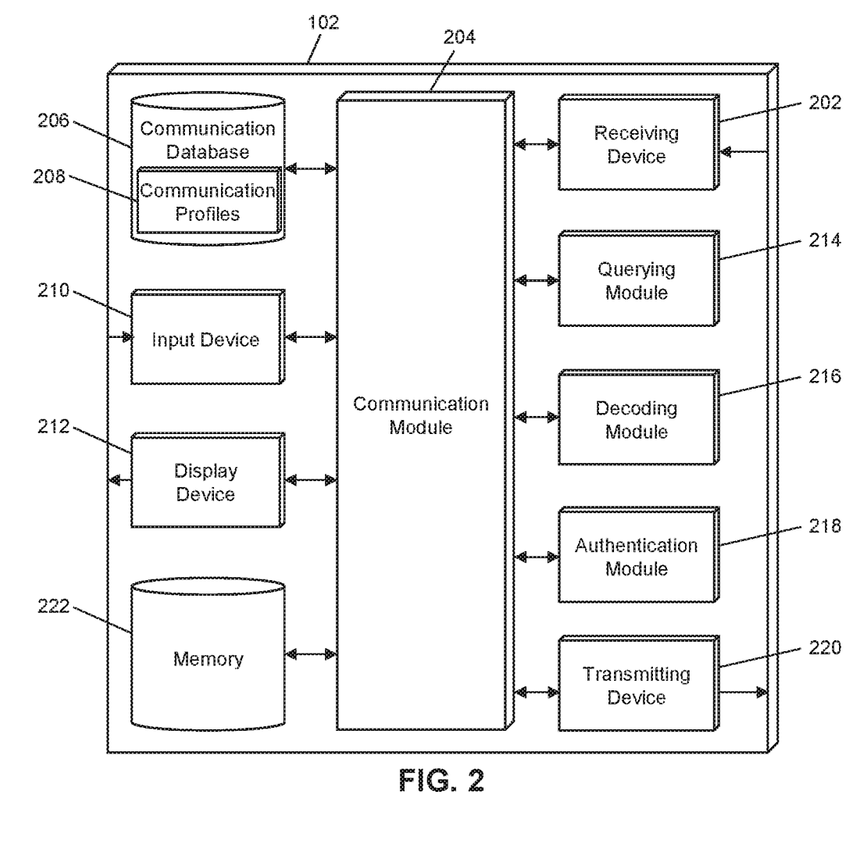
FIG. 2 is a block diagram illustrating the computing device of the system of FIG. 1 for performing remote authentication aided by an audio signal in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from external computing systems 104, web servers 106, processing servers 108, and other systems and entities via one or more communication methods, such as radio frequency, local area networks, wireless area networks, cellular communication networks, short-range wireless communication such as BLUETOOTH, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by processing servers 108, which may be superimposed or otherwise encoded with communication data, such as may be paired with server identification values or received in response to requests for such data. In some cases, the receiving device 202 may also be configured to receive data signals electronically transmitted by external computing systems 104, which may be superimposed or otherwise encoded with data accompanying an emitted audio signal, such as a browser identification value, device identifier, session identifier, etc. The receiving device 202 may also be configured to receive data signals electronically transmitted by web servers 106, which may be superimposed or otherwise encoded with data used in performing the functions discussed herein, such as a communication data and server identification value pair, a profile identifier associated with the user for identification thereof, etc.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 214, decoding module 216, authentication module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may include a communication database 206. The communication database 206 may be configured to store a plurality of communication profiles 208 using a suitable data storage format and schema. The communication database 206 may be a relational database that utilizes structured query language for the storage, identification, modifying, updating, accessing, etc. of structured data sets stored therein. Each communication profile 208 may be a structured data set configured to store data related to a web server 106 or other entity that is registered for the platform enabling remote authentication via the computing device 102. Each communication profile 208 may include, for instance, the server identification value associated with the related web server 106 and communication data, where the communication data may enable the computing device 102 to provide data in electronic transmissions to the related web server 106. The communication data may include, for instance, a communication method (e.g., Internet, e-mail, telephone, etc.) and a corresponding communication address (e.g., internet protocol address, e-mail address, telephone number, etc.). In some cases, a communication profile 208 may also include information to be provided to the web server 106 as part of the remote authentication, such as a profile identifier used to identify the user and data associated therewith.

The computing device 102 may also include or be otherwise interfaced with one or more input devices 210. The input devices 210 may be internal to the computing device 102 or external to the computing device 102 and connected thereto via one or more connections (e.g., wired or wireless) for the transmission of data to and/or from. The input devices 210 may be configured to receive input from a user of the computing device 102, which may be provided to another module or engine of the computing device 102 (e.g., via the communication module 204) for processing accordingly. Input devices 210 may include any type of input device suitable for receiving input for the performing of the functions discussed herein, such as a keyboard, mouse, click wheel, scroll wheel, microphone, touch screen, track pad, camera, optical imager, etc. The input device 210 may be configured to, for example, receive audio signals emitted by an external computing system 104, including ultrasonic audio signals, as well as receive authentication data input by a user of the computing device 102. In some embodiments, the computing device 102 may include a first input device 210 configured to receive audio signals, and a second input device 210 configured to receive the authentication data. In other embodiments, both functions may be performed by a single input device (e.g., a microphone, where the authentication data may be a vocal confirmation provided by the user).

The computing device 102 may also include or be otherwise interfaced with a display device 212. The display device 212 may be internal to the computing device 102 or external to the computing device 102 and connected thereto via one or more connections (e.g., wired or wireless) for the transmission of data to and/or from. The display device 212 may be configured to display data to a user of the computing device 102. The display device 212 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 212. The display device 216 may be configured to, for example, display a prompt to the user requesting the providing of authentication data, and indication of the success or failure of the authentication, and data identifying the web server 106 or other entity requesting authentication (e.g., to provide additional security and peace of mind to the user).

The computing device 102 may include a querying module 214. The querying module 214 may be configured to execute queries on databases to identify information. The querying module 214 may receive one or more data values or query strings, and may execute a query string based thereon on an indicated database, such as the communication database 206, to identify information stored therein. The querying module 214 may then output the identified information to an appropriate engine or module of the computing device 102 as necessary. The querying module 214 may, for example, execute a query on the communication database 206 to identify a communication profile 208 related to a server identification value decoded from an audio signal received by the input device 210.

The computing device 102 may also include a decoding module 216. The decoding module 216 may be configured to decode data for the computing device 102 for performing the functions discussed herein. The decoding module 216 may receive data to be decoded as input, may decode the data, and may output a result of the decoding to another module or engine of the computing device 102. For example, the decoding module 216 may be configured to decode audio signals received by the input device 210 to obtain server identification values and any other data encoded therein (e.g., session identifiers). In some instances, the decoding may be performed by decoding data encoded directly into the audio signal. In other instances, the decoding may be performed by comparing the audio signal to stored audio signals to identify an equivalent audio signal, for identification of a server identification value associated therewith.

The computing device 102 may also include an authentication module 218. The authentication module 218 may be configured to perform authentications for the computing device 102 as part of the performing of the functions discussed herein. The authentication module 218 may receive data to be authenticated, may perform the authentication, and may output a result of the authentication to another module or engine of the computing device 102. For example, the authentication module 218 may be configured to authenticate a user by authenticating data input by the user (e.g., via the input device 210) via comparing supplied authentication data to previously stored (e.g., in a memory 222, discussed below, or a communication profile 208) authentication data.

The computing device 102 may also include a transmitting device 220. The transmitting device 220 may be configured to transmit data over one or more networks via one or more network protocols. In some instances, the transmitting device 220 may be configured to transmit data to external computing systems 104, web servers 106, processing servers 108, and other entities via one or more communication methods, local area networks, wireless area networks, cellular communication, short-range wireless communication such as BLUETOOTH, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to web servers 106 that are superimposed or otherwise encoded with authentication results. The authentication results may include an indication if authentication was successful or unsuccessful, and may also include any additional data to be used by the web server 106, such as a session identifier, profile identifier, other user identifying information, etc. In some embodiments, the transmitting device 220 may be configured to electronically transmit data signals to the processing server 108. Such data signals may be superimposed or otherwise encoded with requests for communication data, which may include a server identification value, requests for communication data and server identification value pairs, or authentication results for forwarding to a web server 106.

The computing device 102 may also include a memory 222. The memory 222 may be configured to store data for use by the computing device 102 in performing the functions discussed herein, such as public and private keys, symmetric keys, etc. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein. The memory 222 may be configured to store, for example, application program data for application programs configured to perform functions discussed herein. For instance, the memory 222 may include specifically configured application programs for performing authentication and decoding audio signals, where separate application programs may be used for such functions or a single application program configured to perform both functions.

Process for Authentication Via Audio Signal Transmission

Figure 3:
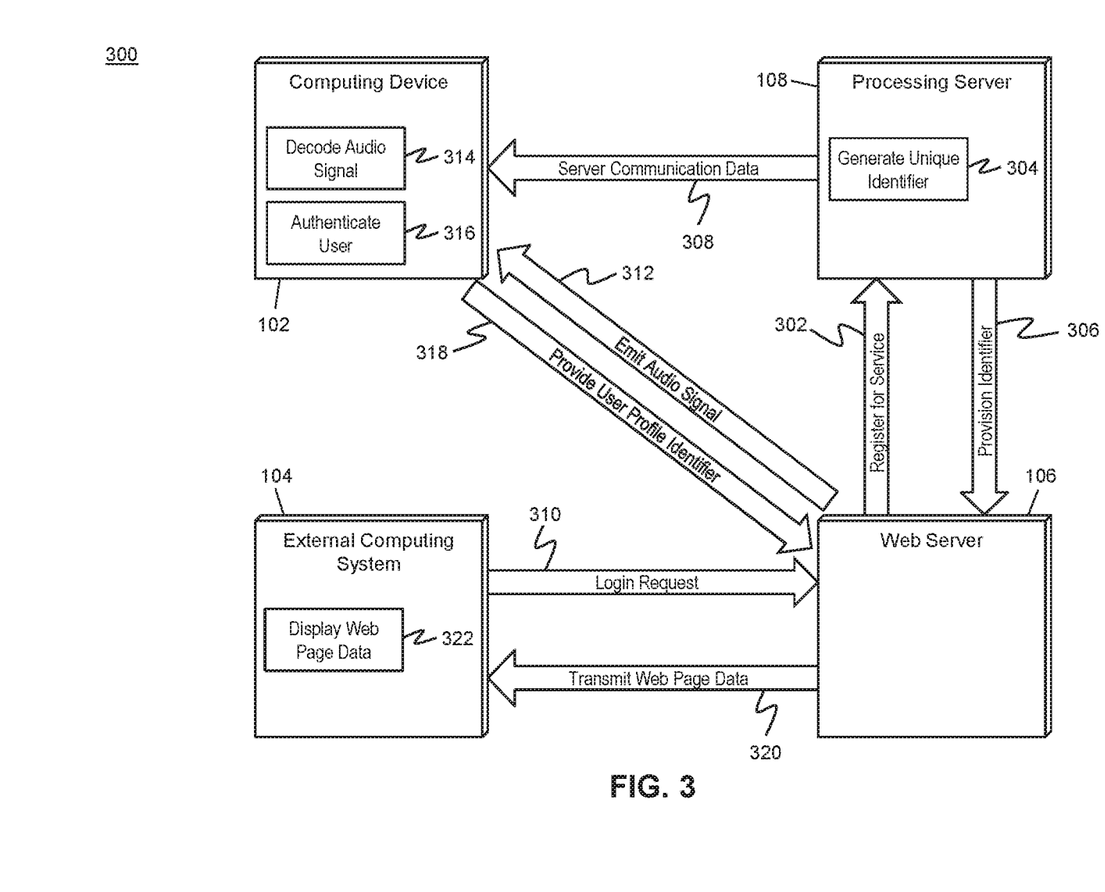
FIG. 3 is a flow diagram illustrating a process for the receipt and storage of itinerary information for a transaction account in the system of FIG. 1 in accordance with exemplary embodiments.

FIG. 3 illustrates a process 300 for the remote authentication of a user in the system 100 of an external computing system 104 on behalf of the web server 106, accomplished using the computing device 102 and processing server 108.

In step 302, the web server 106 may register with the processing server 108 for the remote authentication service. As part of the registration, the web server 106 may provide the processing server 108 with communication data used to provide electronic transmissions to the web server 106, such as a uniform resource locator, internet protocol address, etc. In step 304, the processing server 108 may generate a unique identifier for the web server 106, the web server's server identification value. In step 306, the processing server 108 may provision the server identification value to the web server 106, which the web server 106 may then retain for later use. In step 308, the processing server 108 may electronically transmit a communication data and server identification value pair for the web server 106 to the computing device 102, for receipt by the receiving device 202 thereof. The data pair may be stored (e.g., via the execution of a query by the querying module 214 of the computing device 102) in a communication profile 208 in the communication database 206 that is related to the web server 106.

In step 310, the user may initiate the procedure to log in at the website hosted by the web server 106, which may result in the transmission of a login request from the external computing system 104 used by the user to the web server 106. The login request may include a browser identification value, session identifier, or other value identified by the external computing system 104. The web server 106 may receive the request and, in step 312, may emit an audio signal that is encoded with the server identification value associated with the web server 106 and any other useful data, such as the browser identification value and/or session identifier. In some cases, the audio signal or data to be encoded therein may be provided to the external computing system 104 by the web server 106, where the external computing system 104 may perform the audio emission. For example, the web site hosted by the web server 106 may host the audio signal for playing, which may be audibly emitted by a speaker of the external computing system 104.

In step 314, the input device 210 of the computing device 102 may receive the emitted audio signal, which may then be decoded by the decoding module 216 of the computing device 102. The decoding of the audio signal may yield at least the server identification value associated with the web server 106, as well as any other data encoded therein, such as the browser identification value.

In step 316, the computing device 102 may authenticate the user. The authentication may be performed by receiving (e.g., via the input device 210 thereof) authentication data from the user, which may be compared to authentication data stored in the memory 222 of the computing device 102 by the authentication module 218 of the computing device 102.

Upon the successful authentication of the user, in step 318, the transmitting device 220 of the computing device 102 may electronically transmit a data signal to the web server 106 using the communication data associated (e.g., in a communication profile 208 in the communication database 206 of the computing device 102) with the server identification value, where the data signal is superimposed or otherwise encoded with the profile identifier associated with the user and an indication of successful authentication. In some embodiments, when the input device 210 of the computing device 102 is unable to receive the emitted audio signal despite repeated instances of the audio signal being emitted over a pre-determined period of time (for example, due to the input device 210 being out of range to receive the emitted audio signal for more than thirty seconds), the transmitting device 220 does not electronically transmit a data signal to the web server 106 and consequently, the process 300 ceases (which is akin to automatic logging off for both security and convenience of the user).

The web server 106 may receive the profile identifier and, in step 320, may transmit web page data to the external computing device 104 that may include specialized content or may be otherwise affected by the authentication and identification of the user.

Exemplary Method for Remote Authenticated Aided by an Audio Signal

Figure 4:
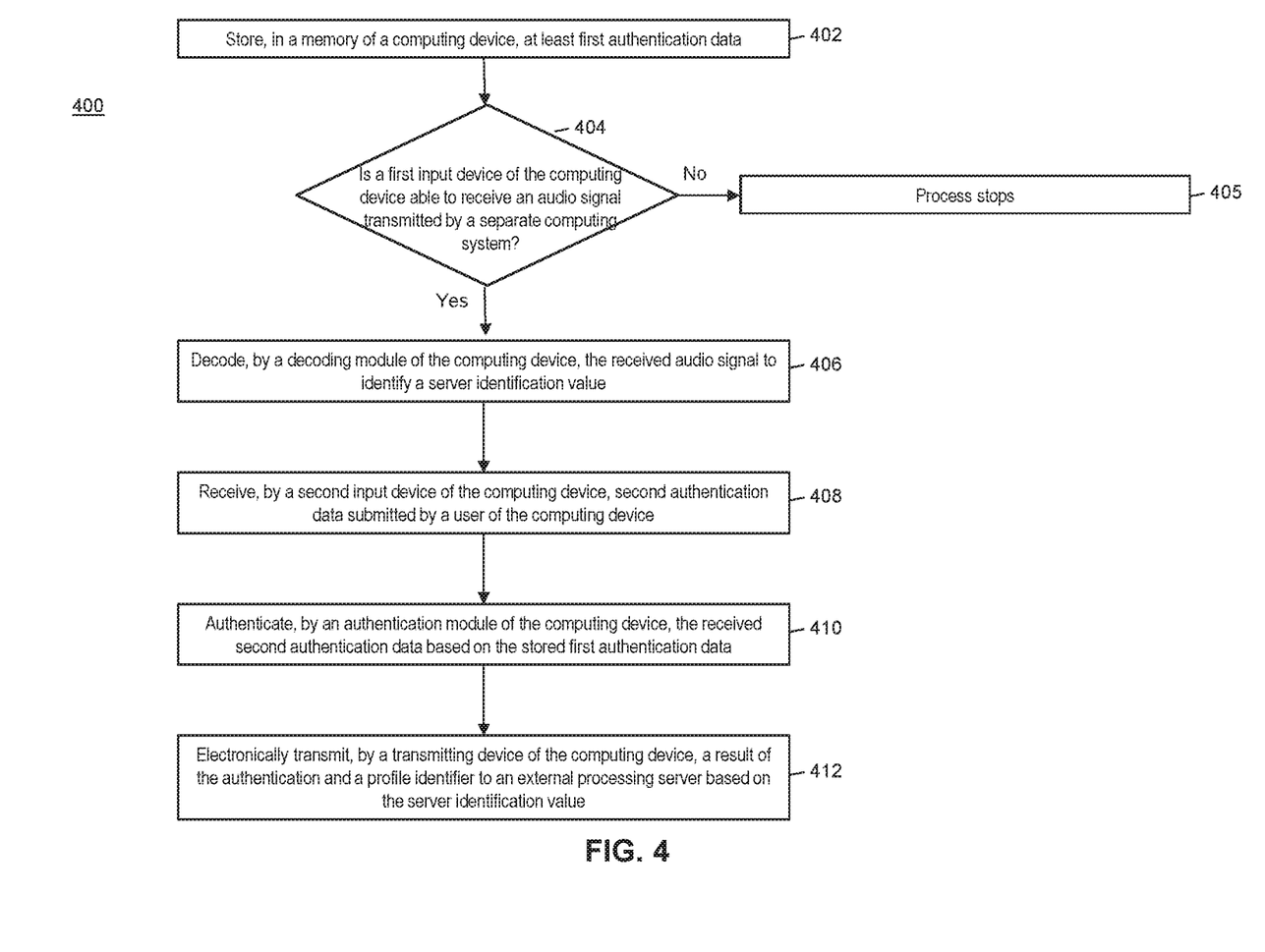
FIG. 4 is a flow chart illustrating an exemplary method for remote authentication aided by an audio signal in accordance with exemplary embodiments.

FIG. 4 Illustrates a method 400 for the remote authentication of a user on an external computing system aided by an emitted audio signal encoded with data.

In step 402, at least first authentication data may be stored in a memory (e.g., the memory 222) of a computing device (e.g., the computing device 102). In step 404, it is determined whether an audio signal may be received by a first input device (e.g., the input device 210) of the computing device that is electronically transmitted by a separate computing system (e.g., the external computing system 104). If no, the method 400 ends at step 405.

If the audio signal is received by the first input device, in step 406, the received audio signal may be decoded by a decoding module (e.g., the decoding module 216) of the computing device to identify a server identification value.

In step 408, second authentication data submitted by a user of the computing device may be received by a second input device of the computing device. In step 410, the received second authentication data may be authenticated by an authentication module (e.g., the authentication module 218) of the computing device based on the stored first authentication data. In step 412, a result of the authentication and a profile identifier may be electronically transmitted by a transmitting device (e.g., the transmitting device 220) of the computing device to an external processing server (e.g., the processing server 108, web server 106, etc.) based on the server identification value.

In one embodiment, the profile identifier may be stored in the memory of the computing device. In some embodiments, the profile identifier may be decoded from the received audio signal by the decoding module of the computing device. In one embodiment, the method 400 may further include: storing, in a communication database (e.g., the communication database 206) of the computing device, a communication profile (e.g., the communication profile 208), wherein the communication profile includes at least the server identification value and a communication path, wherein the electronic transmission to the external processing server uses the communication path stored in the communication profile.

In some embodiments, the method 400 may further include: electronically transmitting, by the transmitting device of the computing device, a communication request to a third party system (e.g., the processing server 108), wherein the communication request includes the server identification value; and receiving, by a receiving device (e.g., the receiving device 202) of the computing device, a communication path from the third party system, wherein the electronic transmission to the external processing server uses the received communication path. In one embodiment, the received audio signal may be ultrasonic. In some embodiments, the decoding module may be executed by a first application program stored in and executed by the computing device, and the authentication module may be executed by a second application program stored in and executed by the computing device. In one embodiment, the first input device may be a microphone. In some embodiments, the first input device and the second input device may be a single device.

Computer System Architecture

Figure 5:
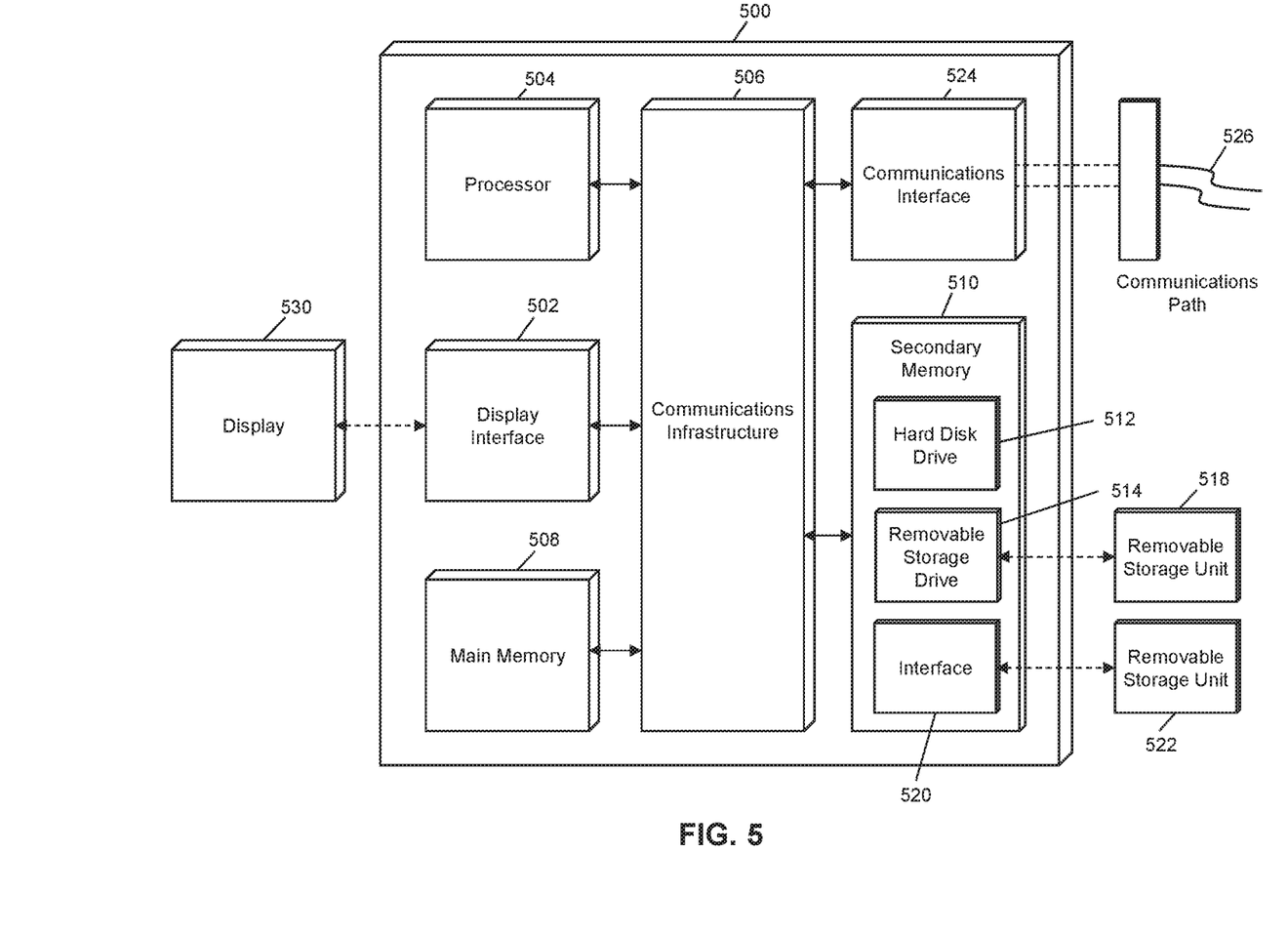
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, optical disc such as BLU-RAY disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for remote authentication aided by an audio signal. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for remote authentication aided by an audio signal, comprising:
   receiving, by a computing device, from a first server, a server identification value and a communication address, the server identification value being assigned by the first server to identify an external processing server separate from the first server, and the communication address identifying an address at which to provide data to the external processing server;
   storing, in a memory of the computing device, the server identification value and the communication address in association with one another;
   receiving, at a first input device of the computing device, an audio signal electronically transmitted by a separate computing system that received the audio signal from the external processing server, the audio signal encoding the server identification value at a first time;
   decoding, by a processor of the computing device, the received audio signal to identify the server identification value;
   accessing, by the processor, the memory to identify the communication address based on the server identification value;
   accessing, by the processor, at least first authentication data stored at the memory of the computing device;
   receiving, by a second input device of the computing device, second authentication data submitted by a user of the computing device;
   authenticating, by the processor, the received second authentication data based on the first authentication data;
   electronically transmitting, by a transmitting device of the computing device, a result of the authentication and a profile identifier to the external processing server based on the communication address stored in association with the server identification value;
   periodically checking, by the processor, whether the audio signal is received at the first input device; and
   determining, by the processor, at a second time after the first time based on the periodically checking, that the audio signal is not received at the second time and that the computing device is no longer in range of the separate computing system, wherein data is not transmitted to the external processing server to indicate that the computing device is no longer in range of the separate computing system.

2. The method of claim 1, wherein the profile identifier is stored in the memory of the computing device.

3. The method of claim 1, further comprising:
   decoding the profile identifier from the received audio signal.

4. The method of claim 1, wherein storing the server identification value and the communication address in association with one another further comprising:
   storing a communication profile comprising the server identification value and the communication address.

5. The method of claim 1, further comprising:
   electronically transmitting, by the transmitting device of the computing device, a communication request to the first server, wherein the communication request includes the server identification value.

6. The method of claim 1, wherein the received audio signal is ultrasonic.

7. The method of claim 1, wherein the decoding is executed by a first application program stored in and executed by the computing device, and the authenticating is executed by a second application program stored in and executed by the computing device.

8. The method of claim 1, wherein the first input device is a microphone.

9. The method of claim 1, wherein the first input device and the second input device are a single device.

10. The method of claim 1, wherein the periodically checking comprises: is determining, over a pre-determined period of time, whether the audio signal is detected by the first input device.

11. A system for remote authentication aided by an audio signal, comprising:
    a memory of a computing device configured to store at least first authentication data;
    a first input device of the computing device configured to receive an audio signal electronically transmitted by a separate computing system that received the audio signal from an external processing server, the audio signal encoding a server identification value at a first time;
    a processor programmed to:
        receive, from a first server, the server identification value and a communication address, the server identification value being assigned by the first server to identify the external processing server separate from the first server, and the communication address identifying an address at which to provide data to the external processing server;
        store, in the memory, the server identification value and the communication address in association with one another;
        decode the received audio signal to identify the server identification value;
        access the memory to identify the communication address based on the server identification value; and
    a second input device of the computing device configured to receive second authentication data submitted by a user of the computing device;
    wherein the processor is further programmed to:
        access the first authentication data from the memory;
        authenticate the received second authentication data based on the stored first authentication data; and
        electronically transmit, via a transmitting device of the computing device, a result of the authentication and a profile identifier to the external processing server based on the communication address stored in association with the server identification value;
        periodically check whether the audio signal is received at the first input device; and
        determine at a second time after the first time based on the periodic check, that the audio signal is not received at the second time and that the computing device is no longer in range of the separate computing system, wherein data is not transmitted to the external processing server to indicate that the computing device is no longer in range of the separate computing system.

12. The system of claim 11, wherein the profile identifier is stored in the memory of the computing device.

13. The system of claim 11, wherein the processor is further programmed to:
    decode the profile identifier from the received audio signal.

14. The system of claim 11, further comprising:
a communication database of the computing device configured to store a communication profile, wherein the communication profile includes at least the server identification value and a communication path, wherein the electronic transmission to the external processing server uses the communication path stored in the communication profile.

15. The system of claim 11, further comprising:
a receiving device of the computing device, wherein the transmitting device of the computing device is further configured to electronically transmit a communication request to the first server, wherein the communication request includes the server identification value.

16. The system of claim 11, wherein the received audio signal is ultrasonic.

17. The system of claim 11, wherein to decode the received audio signal, the processor is programmed to execute a first application program stored in the computing device, and wherein to authenticate the received second authentication data, the processor is programmed to execute a second application program stored in the computing device.

18. The system of claim 11, wherein the first input device is a microphone.

19. The system of claim 11, wherein the first input device and the second input device are a single device.

20. A computing device for remote authentication aided by an audio signal, the computing device comprising at least one processor configured to:

receive, from a first server, a server identification value and a communication address, the server identification value being assigned by the first server to identify a second server separate from the first server, and the communication address identifying an address at which to provide data to the second server;

store, in a memory of the computing device, the server identification value and the communication address in association with one another;

receive, at a first input device of the computing device, an audio signal electronically transmitted by a separate computing system that received the audio signal from the second server, the audio signal encoding the server identification value;

decode the received audio signal to identify the server identification value;

access the memory to identify the communication address based on the server identification value;

receive, via a second input device of the computing device, second authentication data submitted by a user of the computing device;

access, from the memory, first authentication data;

authenticate the received second authentication data based on the first authentication data; and electronically transmit, via a transmitting device of the computing device, a result of the authentication and a profile identifier based on the communication address.

* * * * *